US009482550B2

(12) United States Patent
Van Wieringen et al.

(10) Patent No.: US 9,482,550 B2
(45) Date of Patent: Nov. 1, 2016

(54) LINEAR ROUTE PROGRESS INTERFACE

(71) Applicant: INRIX Inc., Kirkland, WA (US)

(72) Inventors: Brent Michael Van Wieringen, Seattle, WA (US); John Thomas Hurr, Seattle, WA (US)

(73) Assignee: INRIX Inc., Kirkland, WA (US)

( * ) Notice: Subject to any disclaimer, the term of this patent is extended or adjusted under 35 U.S.C. 154(b) by 0 days.

(21) Appl. No.: 14/527,852

(22) Filed: Oct. 30, 2014

(65) Prior Publication Data
US 2016/0123761 A1    May 5, 2016

(51) Int. Cl.
| G01C 21/00 | (2006.01) |
| G01C 21/36 | (2006.01) |
| G06F 3/0484 | (2013.01) |
| G01C 21/34 | (2006.01) |
| G08G 1/0962 | (2006.01) |

(52) U.S. Cl.
CPC ....... *G01C 21/3697* (2013.01); *G01C 21/3415* (2013.01); *G01C 21/3492* (2013.01); *G01C 21/3691* (2013.01); *G06F 3/0484* (2013.01); *G08G 1/0962* (2013.01)

(58) Field of Classification Search
CPC .............. H02K 7/116; H02K 7/1846; G08G 1/096716; G08G 1/096775; G08G 1/096741; G08G 1/096827; G08G 1/096783; G08G 1/09675; G08G 1/20; B60K 2001/0416; B60K 25/08; B60K 2350/1072; B60K 37/02; G01C 21/3697; G01C 21/3415; G01C 21/3492

USPC ........................... 701/400–541; 340/988–996
See application file for complete search history.

(56) References Cited

U.S. PATENT DOCUMENTS

| 2007/0225902 | A1* | 9/2007 | Gretton | G01C 21/26 701/533 |
| 2012/0150436 | A1* | 6/2012 | Rossano | G01C 21/3694 701/450 |
| 2013/0253811 | A1* | 9/2013 | Miyajima | G08G 1/0112 701/118 |
| 2013/0345902 | A1* | 12/2013 | Papajewski | B60W 40/1005 701/1 |
| 2013/0345975 | A1* | 12/2013 | Vulcano | G01C 21/3632 701/533 |

* cited by examiner

*Primary Examiner* — Muhammad Shafi
(74) *Attorney, Agent, or Firm* — Cooper Legal Group, LLC

(57) ABSTRACT

One or more techniques and/or systems are provided for providing linear route progress. For example, a linear route progress interface, comprising a linear route representation of a route from a starting location to a destination location, may be displayed. The linear route representation may linearly represent a progress of the user along the route (e.g., as opposed to directions on a map that may otherwise visually overwhelm a user merely interested in traffic flow and/or incident information that may affect an arrival time of the user). The linear route progress interface may be populated with traffic flow indicators (e.g., traffic flow speed) and/or incident indictors (e.g., indicating accidents, construction, etc.). A user indicator, corresponding to a current position of the user, may be populated within the linear route progress interface. The user indicator and/or the linear route representation may be modified to illustrate user progress along the route.

26 Claims, 13 Drawing Sheets

LINEAR ROUTE PROGRESS INTERFACE

BACKGROUND

Many users utilize various devices to obtain route information. In an example, a user may utilize a smart phone to obtain walking directions to a nearby restaurant. In another example, a user may utilize a vehicle navigation device to obtain a map populated with driving directions to an amusement park. In a driving situation, a driver may want to view information that may affect an arrival time to a destination, such as traffic congestion and/or road incidents (e.g., construction and accidents).

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for providing linear route progress are provided herein. In an example, a linear route progress interface may be displayed to a user (e.g., through a vehicle navigation device). The linear route progress interface may comprise a linear route representation of a route from a starting location (e.g., a work building of the user) to a destination location (e.g., a home of the user). In an example, the linear route representation may be configured according to a linear shape, such as a bar, used to convey the user's progress towards reaching the destination location (e.g., a vertical or horizontal progress bar). In an example, the linear route representation if formatted according to a linear non-map configuration (e.g., the linear route representation may not representing directions within a map), which may decrease the amount of unnecessary information, otherwise conveyed by the map, that could have distracted or overwhelm the user.

The linear route progress interface may be populated with traffic flow indicators. A traffic flow indicator may be used to convey traffic flow conditions to the user (e.g., a segment of the linear route representation may be colored or shaded to indicate a traffic flow condition such as clear, normal, slow, standstill, etc.). The linear route progress interface may be populated with incident indicators. An incident indicator may be used to convey traffic incidents, such as accidents or construction, to the user (e.g., an accident icon may be displayed at a position along the linear route representation corresponding to a progress point of the route where an accident has occurred). In an example, a predicted state of the route, corresponding to a time at which the user is to traverse the route (e.g., the user may normally leave work in 4 hours at 5:00 pm), may be generated based upon a current state of the route, traffic flow and incident information, and/or historical traffic flow condition and incident resolution information. Predicted traffic flow indicators and/or predicted incident indicators (e.g., corresponding to the predicted state of the route at 5:00 pm as opposed to the current state of the route at 1:00 pm) may be populated within the linear route progress interface.

The linear route progress interface may be populated with a user indicator corresponding to a current user position. In an example, responsive to identifying user progress along the route, the linear route representation may be modified with respect to the user indicator to indicate the user progress (e.g., the user indicator may be anchored to a fixed position within the linear route progress interface, and the linear route representation may be moved with respect to the user indicator to illustrate the user progress). In another example, responsive to identifying user progress along the route, a display location of the user indicator may be modified with respect to the linear route representation to indicate the user progress (e.g., the linear route representation may be anchored to a fixed position within the linear route progress interface, and the user indicator may be moved with respect to the linear route representation to illustrate the user progress).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
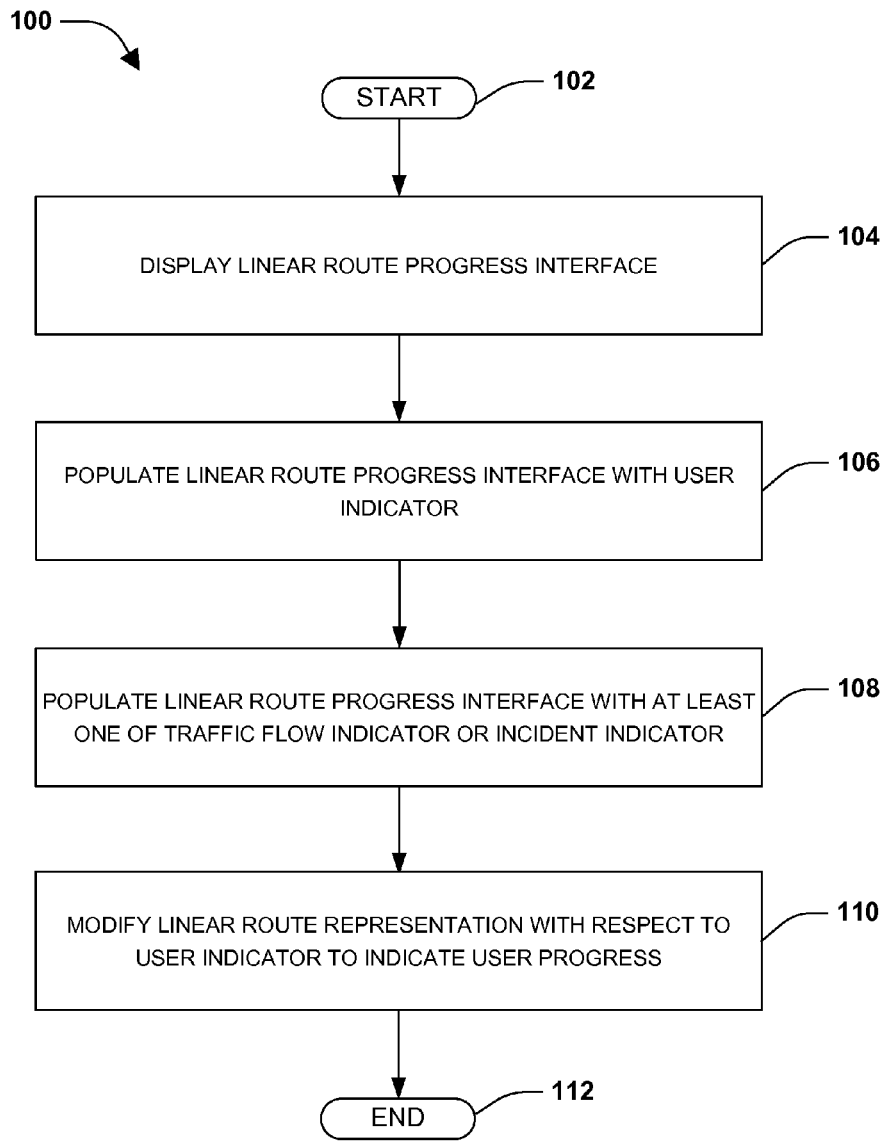
FIG. 1 is a flow diagram illustrating an exemplary method of providing linear route progress, where a linear route representation is modified with respect to a user indicator to indicate user progress.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques for providing linear route progress are provided herein. Users may have a desire to view information that may affect an arrival time to a destination, such as accidents, construction, and/or traffic congestion. Unfortunately, such information may be represented pictorially on a map, which may otherwise be visually overwhelming and/or distracting to the user (e.g., the user may merely be interested in conditions that may affect an arrival time to home along a route that is already known to the user, and thus the map and/or directions may be visual noise to the user). Accordingly, as provided herein, a linear route progress interface, comprising a linear route presentation of a route (e.g., a travel progress bar), may be displayed. The linear route progress interface may be populated with traffic flow indicators and/or incident indicators. Displaying traffic flow indicators and/or incident indicators with the linear route representation may provide the user with information that may be relevant to the user's commute time, as opposed to overwhelming the user with unnecessary information that may be distracting (e.g., the map and/or directions may unnecessarily distract the user because the user may already know how to travel the route home). In this way, driver distraction concerns may be decreased.

An embodiment of providing linear route progress is illustrated by an exemplary method 100 of FIG. 1. At 102, the method starts. In an example, a user may request to see information that may affect a route that the user is to travel from a starting location to a destination location (e.g., a commute from home to a local water park). For example, a route creation interface may be exposed to the user (e.g., through a route creation service accessed by the user through a personal computer at home). The route creation interface may comprise a route departure time specification interface (e.g., a first time slider interface element), a destination arrival time specification interface (e.g., a second time slider interface element), a starting location specification interface, a destination location specification interface, and/or other interfaces. For example, the user may specify a desired departure time through the route departure time specification interface (e.g., and may not specify a destination arrival time, such that an estimated arrival time may be provided to the user) or the user may specify a desired arrival time through the destination arrival time specification interface (e.g., and may not specify a departure time, such that a suggested departure time may be provided to the user so that the user arrives at the destination at the desired arrival time). A generate route request may be received from the user. The generate route request may comprise the starting location, the destination location, a specified route departure time, and/or a specified destination arrival time (e.g., the user may request a route and a suggested departure time so that the user can arrive at the local water park at 10:00 am). A linear route progress interface may be generated (e.g., for display on a vehicle navigation device) based upon the generate route request.

At 104, the linear route progress interface may be displayed. The linear route progress interface may comprise a linear route representation of the route from the starting location to the destination location (e.g., a route having a shortest commute time, a route meeting user criteria such as no highway driving, a route historically taken by the user, etc.). The linear route representation may be formatted according to a linear non-map configuration. For example, the linear route representation may not represent driving directions on a map, but may comprise a vertical progress bar, a horizontal progress bar, or other linear progress bar representing the user's progress along the route.

At 106, the linear route progress interface may be populated with a user indicator corresponding to a current position of the user. In an example, the user indicator may be positioned at a fixed position within the linear route progress interface (e.g., such that the linear route representation may be moved with respect to the user indicator in order to illustrate user progress along the route). At 108, the linear route progress interface may be populated with a traffic flow indicator and/or an incident indicator. The traffic flow indicator may indicate a traffic flow for a segment of the route. For example, the traffic flow indicator may comprise a portion of the liner route representation that is visually modified to represent a traffic flow of a corresponding segment (e.g., highlighted; colored such as green to show normal traffic flow, yellow for slow traffic flow, and red for stopped traffic flow; shaded; textually labeled, visually labeled, etc.). The incident indicator may visually indicate accidents, constructions, and/or other incidents that may affect the user's arrival time to the destination location. For example, the incident indicator may comprise an accident icon that is overlaid a portion of the linear route representation corresponding to a route segment under construction.

In an example, a current state of the route may be obtained. The linear route progress interface may be populated with a current traffic flow indicator and/or a current incident indicator based upon the current state. In this way, the user may view current conditions of the route that may affect the user's arrival time at the destination.

In another example, a predicted state of the route, corresponding to a time at which the user is to traverse the route (e.g., a departure time at 9:30 am, which may be in 2 hours from a current time of 7:30 am, which may be identified based upon the user indicating a desired arrival time of 10:00 am at the local water park that is usually a 30 minute commute from the user's home). The predicted state may be derived from the current state of the route, traffic flow and incident information for the route (e.g., an accident at 7:00 am to which an ambulance and tow truck has been dispatch), historical traffic flow conditions and incident resolution information for the route (e.g., accidents are generally resolved for the route in 2 hours from the dispatch of a tow truck and ambulance; a particular construction site generally becomes worse after 8:30 am; etc.), and/or other information that may be used to predict what traffic flow and incident conditions will be from 9:30 am until the user arrives at the local water park (e.g., which may also be used to determine and/or adjust a departure time so that the user reaches the local water park by 10:00 am). The linear route progress interface may be populated with a predicted traffic flow indicator and/or a predicted incident indicator (e.g., future accidents may be predicted based upon historical accident information indicating a high likelihood of a second accident occurring at the construction site soon after a morning accident has occurred) based upon the predicted state. In this way, the user may view predicted conditions of the route that may be relevant to the user's actual travel time along the route.

In an example, a time remaining until route completion indicator may be displayed through the linear route progress interface (e.g., an indication that the user has an estimated time of arrival in 22 minutes). The time remaining until route completion indicator may be updated based upon user progress along the route, a current travel condition change, or an estimated travel condition change (e.g., an estimated delay based upon a notification that a construction crew just closed down a lane). In this way, the time remaining until route completion indicator may be increased or decreased based upon various information that may affect or be indicative of the user's arrival time.

In an example, the linear route progress interface may be populated with an alternative linear route representation of an alternative route from a start detour location to the destination location. For example, the alternative route may reduce the user's travel time by 10 minutes because the alternative route may detour around an accident. The alternative linear representation may be displayed as a second progress bar that branches off the of the linear route representation. In this way, the user may be presented with various linear route representations that represent various routes to the destination location.

At 110, responsive to identifying user progress along the route (e.g., the user traveling along the route), the linear route representation may be modified with respect to the user indicator to indicate the user progress. For example, the user indicator may remain at the fixed position within the linear route progress interface, and the linear route representation may be moved to visually differentiate a traveled portion of the route traveled by the user and an un-traveled portion of the route not yet traveled by the user. In an example, responsive to the user progress indicating that the user traveled from a first route segment to a second route segment, the linear route representation may be modified with respect to the user indicator to indicate that the first route segment has been traveled (e.g., the first route segment may be moved "behind", such as to the left, of the user indicator and/or a color of the first route segment may be changed to a travel complete color indicator) and that the second route segment is currently being traveled by the user (e.g., a view of the second route segment may be expanded to, such as zoomed into or blown up into, an expanded view having an increased level of granularity for traffic flow information and/or incident information, such as display of a previously hidden/collapsed incident indictor and/or a previously hidden/collapsed traffic flow indicator that may have otherwise been at too low of a level of granularity to display when the user was not traveling the second route segment). At 112, the method ends.

Figure 2A:
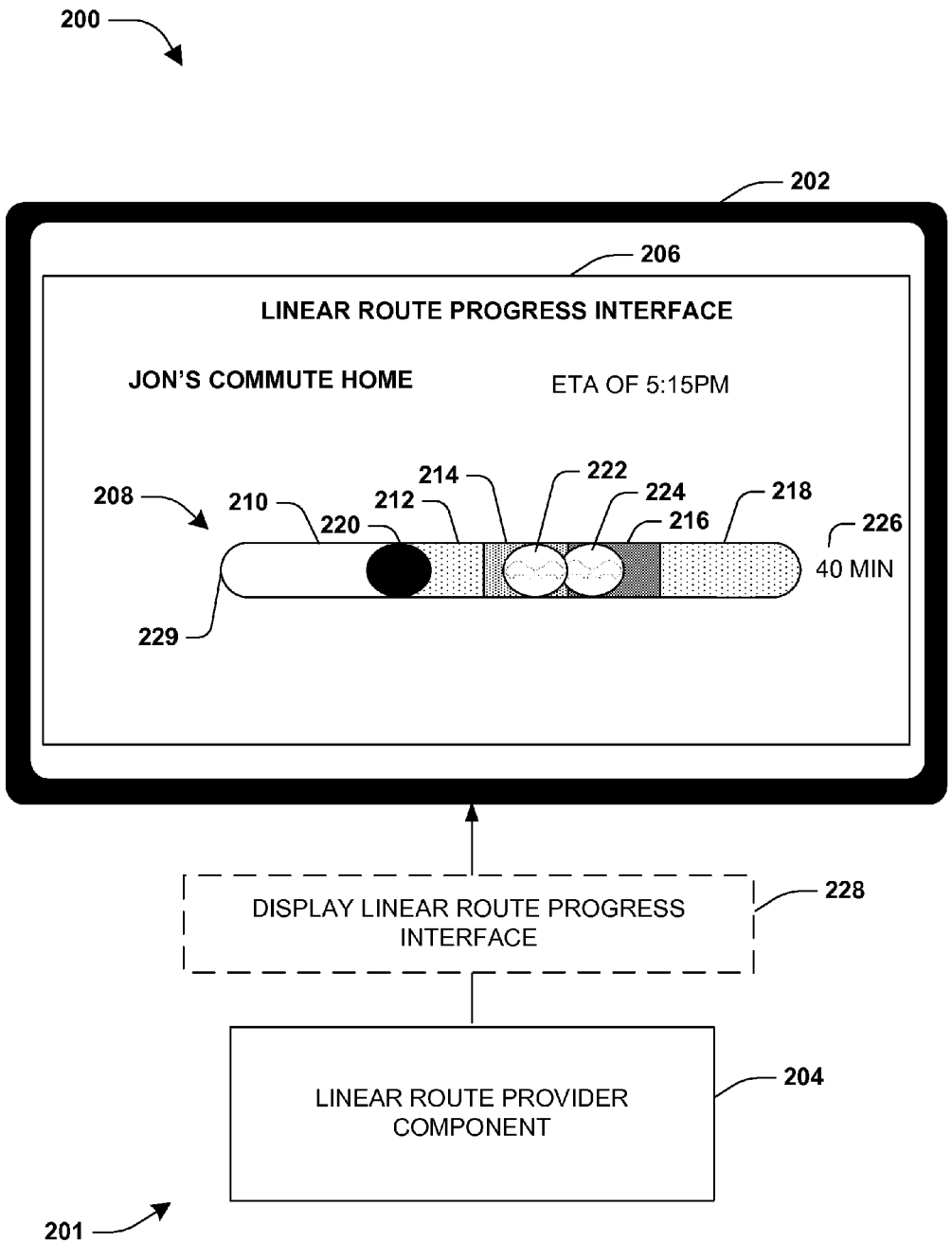
FIG. 2A is a component block diagram illustrating an exemplary system for providing linear route progress, where a linear route representation is displayed.

FIGS. 2A-2D illustrate examples of a system 201, comprising a linear route provider component 204, for providing linear route progress. FIG. 2A illustrates an example 200 of the linear route provider component 204 being associated with a user device 202 of a user, Jon. The linear route provider component 204 may be configured to display 228 a linear route progress interface 206 on the user device 202. For example, the user may submit a generate route request, through a route creation interface to the linear route provider component 204, for a route from a work building to home.

Accordingly, the linear route provider component 204 may display the linear route progress interface 206 comprising a linear route representation 208 (e.g., a progress bar) representing the route from the work building to home. The linear route progress interface 206 may be populated with a user indicator 220 corresponding to a current position of the user. For example, the user indicator 220 may be located at a 30% completion point along the linear route representation 208 from a starting end 229 of the linear route representation 208 based upon the current position of the user indicating that 30% of the route to home has been completed. A completed portion 210 of the linear route representation 208 may visually indicate that the user has traversed the completed portion 210 (e.g., the completed portion 210 may be colored and/or moved "behind" the user indicator 220).

The linear route provider component 204 may populate the linear route progress interface 206 with traffic flow indicators and/or incident indicators. In an example, a first traffic flow indicator 212, a second traffic flow indicator 214, a third traffic flow indicator 216, and a fourth traffic flow indicator 218 may visually represent traffic flow conditions, along portions of the linear route representation 208, corresponding to segments of the route. For example, the first traffic flow indicator 212 and the fourth traffic flow indicator 218 may be colored and/or shaded to indicate a normal traffic flow. The second traffic flow indicator 214 may be colored and/or shaded to indicate a slow traffic flow. The third traffic flow indicator 216 may be colored and/or shaded to indicate a very slow or stopped traffic flow. It may be appreciated that a variety of visual indicators, such as coloring, shading, highlighting, labeling, etc., may be used to illustrate a wide range of traffic flow conditions. In an example, a first incident indicator 222, illustrating a first incident such as construction, and a second incident indicator 224, illustrate a second incident such as a traffic accident, may represent incidents, at portions of the linear route representation 208, corresponding to segments of the route at which such incidents occurred.

The linear route progress interface 206 may display various information to the user. In an example, an estimate time of arrival may be displayed. In an example, a time remaining until route completion indicator 226 may be displayed. The time remaining until route completion indicator 226 may be updated (e.g., increased or decreased) based upon user progress, a current travel condition change (e.g., an accident may become clear), an estimated travel condition change (e.g., a tow truck may be dispatched to a second accident that is estimated to become clear in 20 minutes), etc. In an example, the linear route progress interface 206 may format and display the linear route representation 208 according to a linear non-map configuration, such that the linear route representation 208 represents progress along the route as opposed to directions along a map, which may otherwise visually overwhelm the user that may merely seek information that may affect the user's arrival time to home.

Figure 2B:
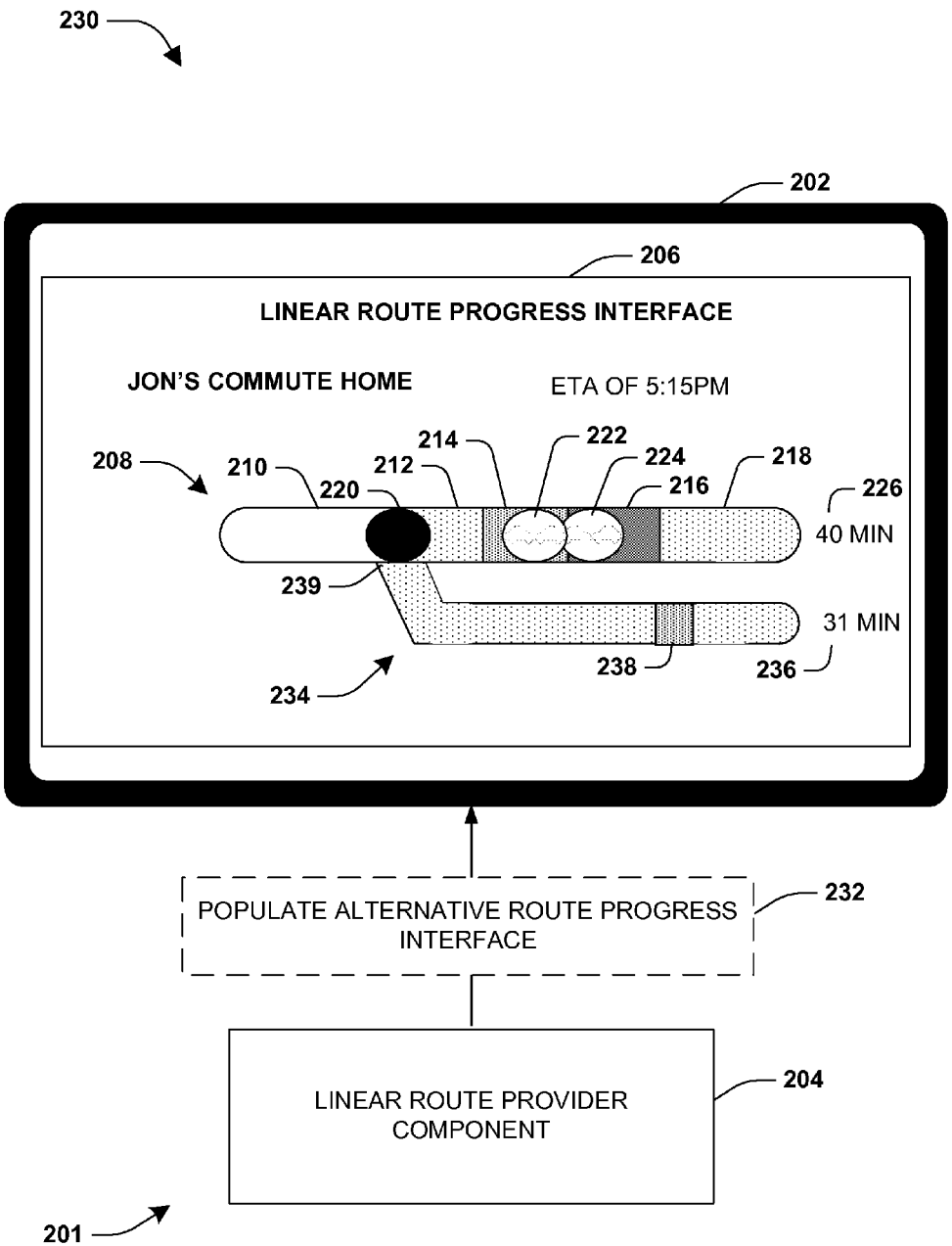
FIG. 2B is a component block diagram illustrating an exemplary system for providing linear route progress, where a linear route representation and an alternative linear route representation are displayed.

FIG. 2B illustrates an example 230 of the linear route provider component 204 populating 232 the linear route progress interface 206 with an alternative linear representation 234 of an alternative route from a start detour location 239 to the destination location of home. For example, the linear route provider component 204 may identify the alternative route as providing the user with a quicker commute to home. The linear route provider component 204 may populate the alternative linear representation 234 with traffic flow indicators and/or incident indicators, such as a traffic flow indicator 238 indicating a slow traffic flow for a segment of the alternative route. A time remaining until alternative route completion indicator 236 may be displayed for the alternative route. In an example, alternative route instructions, not illustrated, may be provided to the user for the alternative route. In this way, one or more routes may be linearly represented by linear route representations.

Figure 2C:
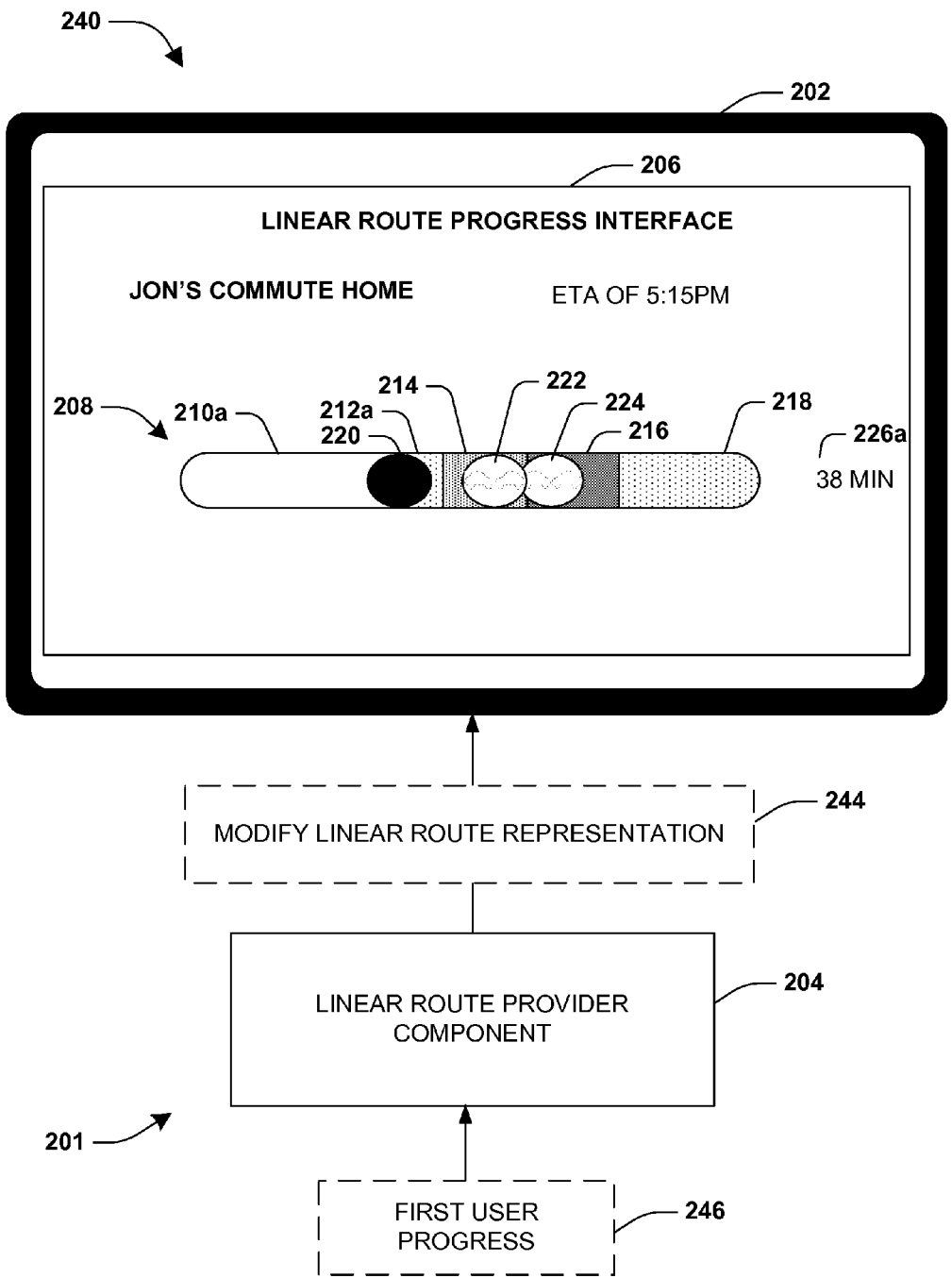
FIG. 2C is a component block diagram illustrating an exemplary system for providing linear route progress, where a linear route representation is modified based upon first user progress.

FIG. 2C illustrates an example 240 of the linear route provider component 204 modifying 244 the linear route representation 208 with respect to the user indicator 220 to indicate first user progress 246 along the route. For example, the user may have traveled 5% further along the route to a 35% completion point. The linear route provider component 204 may modify a display position of the linear route representation 208 (e.g., by moving 5% of the linear route representation 208 "behind" the user indicator 220, such as to the left of the user indicator 220) to illustrate the first user progress 246. For example, 35% of the linear route representation 208, corresponding to the previous 30% previously completed portion and the 5% first user progress 246, may be included with the completed portion 210 of the linear route representation 208, resulting in an updated completed portion 210a. Because at least some of the 5% user progress 246 may correspond to the first traffic flow indicator 212, at least some of the first traffic flow indicator 212 may be included with the updated completed portion 210a, thus resulting in an updated first traffic flow indicator 212a. The linear route provider component 204 may update the time remaining until route completion indicator 226 based upon the first user progress 246 (e.g., the time remaining may be decreased from 40 minutes to 38 minutes), resulting in an updated time remaining until route completion indicator 226a.

Figure 2D:
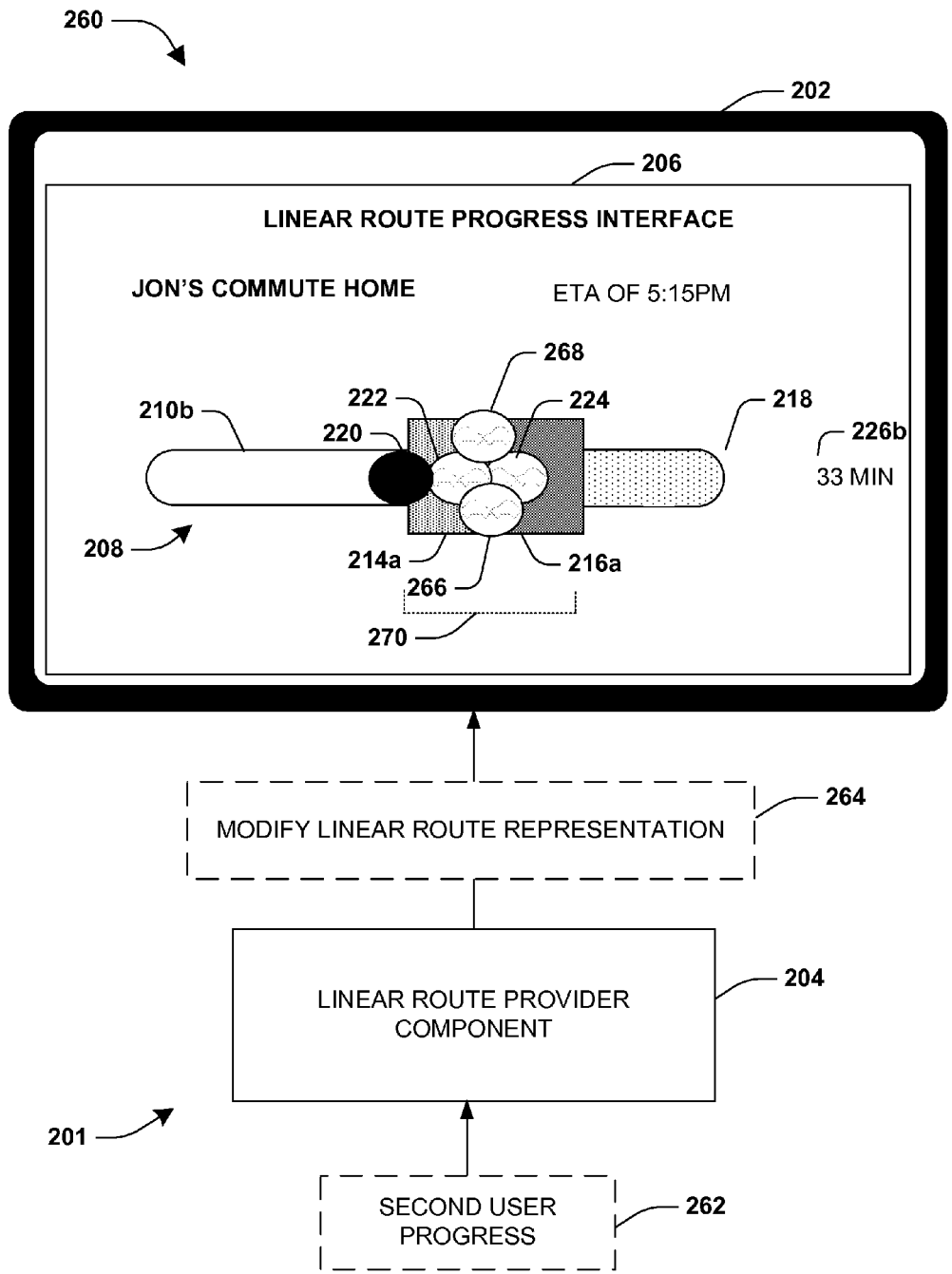
FIG. 2D is a component block diagram illustrating an exemplary system for providing linear route progress, where a linear route representation is modified based upon second user progress.

FIG. 2D illustrates an example 260 of the linear route provider component 204 modifying 264 the linear route representation 208 with respect to the user indicator 220 to indicate second user progress 262 along the route. For example, the user may have traveled 3% further along the route to a 38% completion point. The linear route provider component 204 may modify a display position of the linear route representation 208 (e.g., by moving 3% of the linear route representation 208 "behind" the user indicator 220, such as to the left of the user indicator 220) to illustrate the second user progress 262. For example, 38% of the linear route representation 208, corresponding to the 35% previously completed portion and the 3% second user progress 262, may be included with the updated completed portion 210a of the linear route representation 208, resulting in a second updated completed portion 210b. In an example, responsive to the user indicator 220 corresponding to a segment 270 of the linear route representation 208 (e.g., corresponding to a segment of the route currently being traveled by the user or soon to be traveled by the user), a view of the segment 270 may be expanded into an expanded view. The expanded view may have an increased level of granularity for traffic flow information and/or incident information (e.g., a third incident indicator 266 and a fourth incident indicator 268 may be displayed at the increased level of granularity; the second traffic flow indicator 214 may be expanded into an expanded second traffic flow indicator 214a; the third traffic flow indicator 216 may be expanded into an expanded third traffic flow indicator 216a; etc.). In this way, the user may easily identify relevant traffic flow information and/or incident information of the route. The linear route provider component 204 may update the updated time remaining until route completion indicator 226a based upon the second user progress 262 (e.g., the time remaining may be decreased from 38 minutes to 33 minutes), resulting in a second updated time remaining until route completion indicator 226b.

Figure 3A:
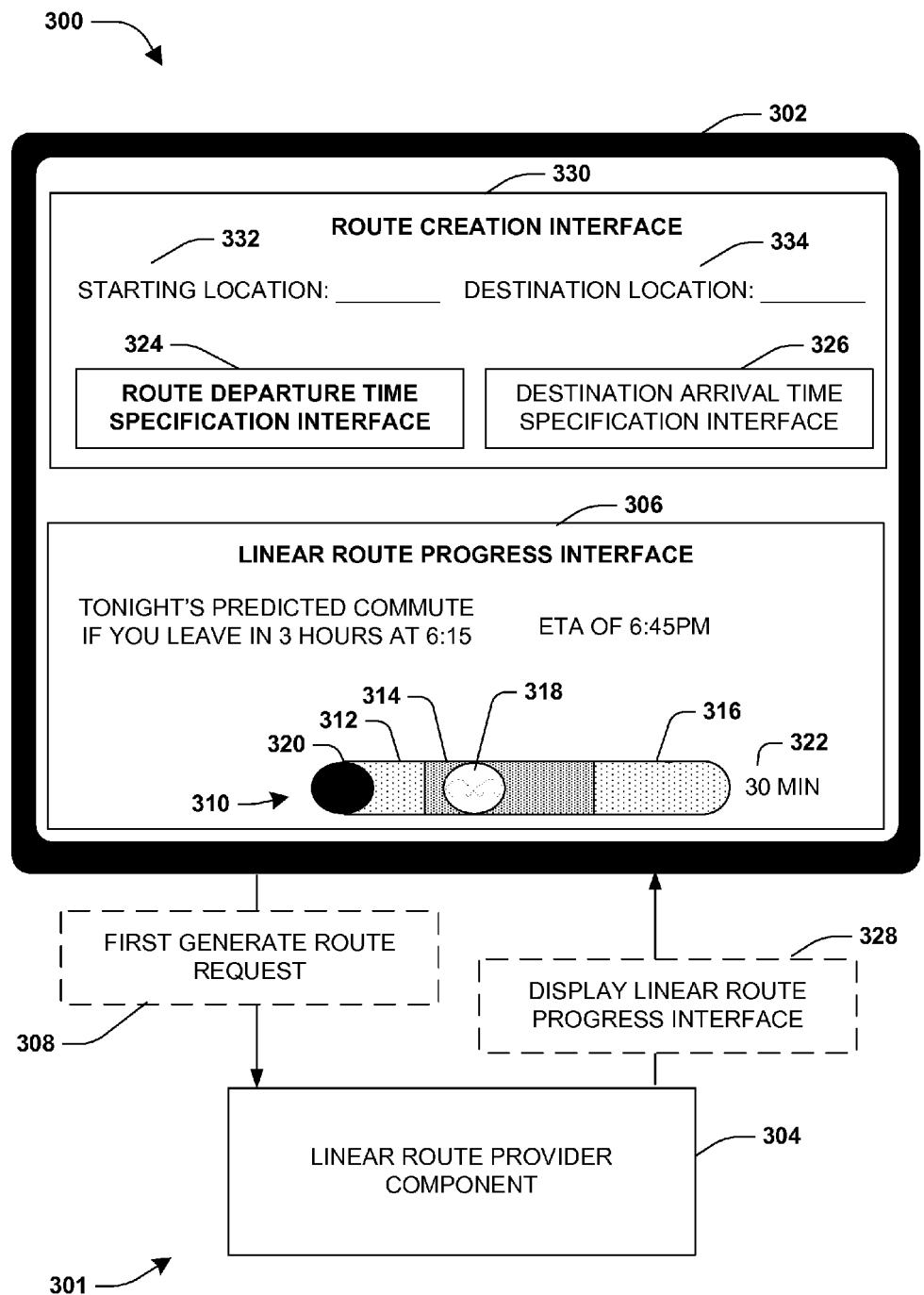
FIG. 3A is a component block diagram illustrating an exemplary system for providing linear route progress, where a route creation interface and a linear route representation are displayed.
Figure 3B:
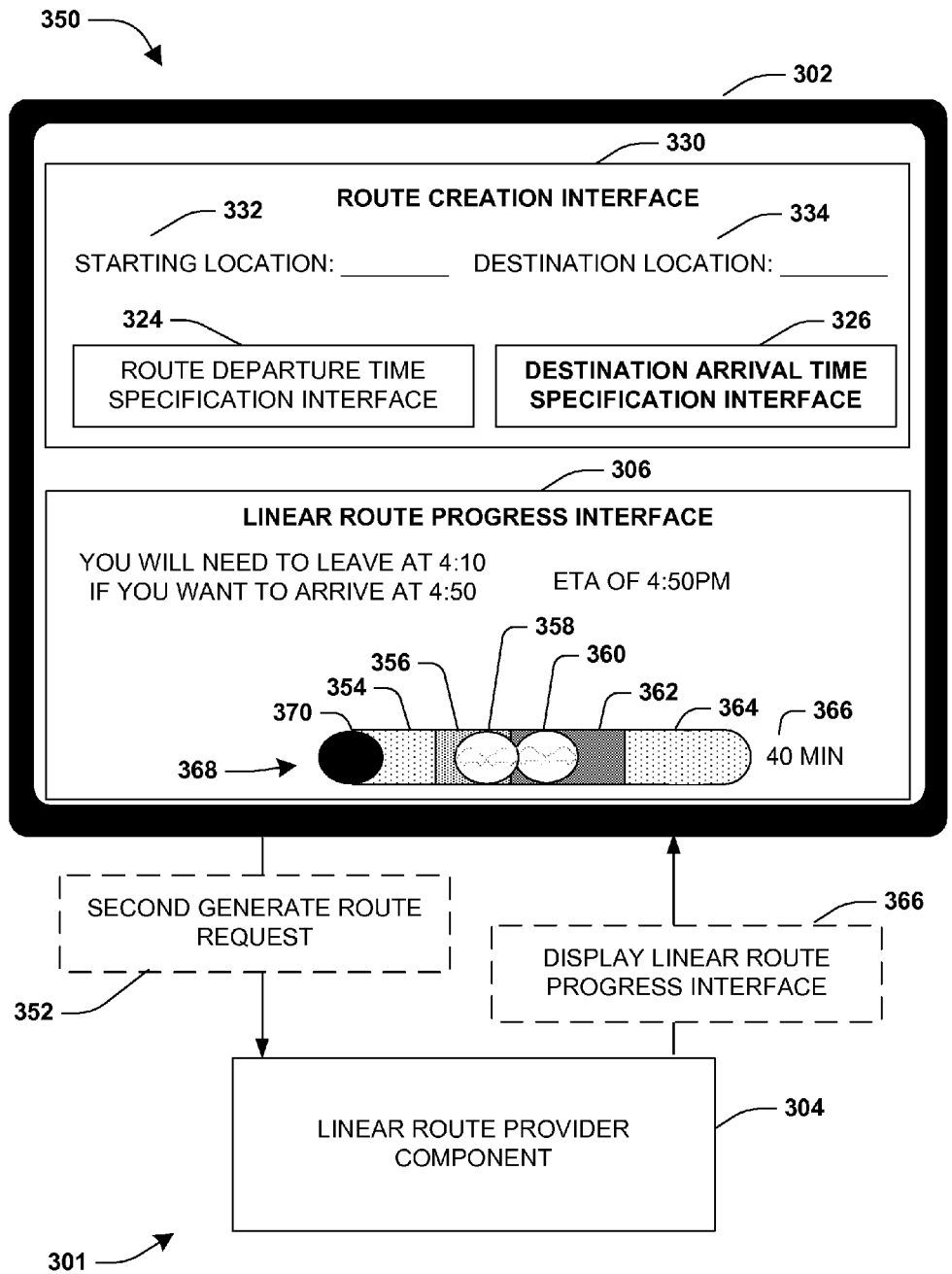
FIG. 3B is a component block diagram illustrating an exemplary system for providing linear route progress, where a route creation interface and a linear route representation are displayed.

FIGS. 3A and 3B illustrate examples of a system 301, comprising a linear route provider component 304, for provided linear route progress. FIG. 3A illustrates an example 300 of the linear route provider component 304 displaying a route creation interface 330 through a user device 302. The route creation interface 330 may comprise a starting location specification interface 332 through which a user may specify a starting location for a route. The route creation interface 330 may comprise a destination location specification interface 334 through which the user may specify a destination location for the route. The route creation interface 330 may comprise a route departure time specification interface 324 (e.g., a first slider interface element through which the user may select a departure time) through which the user may specify a desired departure time. The route creation interface 330 may comprise a destination arrival time specification interface 326 (e.g., a second slider interface element through which the user may select an arrival time) through which the user may specify a desired arrival time (e.g., and thus a suggestion departure time may be provided to the user based upon the desired arrival time).

In an example, the linear route provider component 304 may receive a first generate route request 308 from the route creation interface 330. The first generate route request 308 may comprise a starting location, a destination location, and a specified route departure time of 6:15 pm. The linear route provide component 304 may display 328 a linear route progress interface 306 comprising a first linear route representation 310 based upon the first generate route request 308. The linear route progress interface 306 may be populated with a user indicator 320, traffic flow indicators (e.g., a first traffic flow indicator 312 indicating normal traffic flow, a second traffic flow indicator 314 indicating slow traffic flow, and a third traffic indicator 314 indicating normal traffic flow), incident indicators (e.g., a first incident indicator 318 indicating a traffic accident), and/or a time remaining until route completion indicator 322. In an example, a predicted state of the route, corresponding to 6:15 pm to 6:45 pm, may be determined based upon a current state of the route, traffic flow and incident information for the route, and/or historical traffic flow conditions and incident resolution information. The traffic flow indicators, populated within the linear route progress interface 306, may correspond to predicted traffic flow indicators derived from the predicted state. The incident indicators, populated within the linear route progress interface 306, may correspond to predicted incident indicators derived from the predicted state. In this way, the user may view relevant traffic flow and incident information of the route for a time (e.g., 3 hours from a current time of 3:15 pm) during which the user is traveling the route.

FIG. 3B illustrates an example 350 of the linear route provider component 304 receiving a second generate route request 352 from the route creation interface 330. The second generate route request 352 may comprise the starting location, the destination location, and a specified destination arrival time of 4:50 pm. The linear route provide component 304 may display 366 the linear route progress interface 306 comprising a second linear route representation 368 based upon the second generate route request 352. The linear route progress interface 306 may be populated with a user indicator 370, traffic flow indicators (e.g., a first traffic flow indicator 354 indicating normal traffic flow, a second traffic flow indicator 356 indicating slow traffic flow, a third traffic flow indicator 362 indicating very slow or stopped traffic flow, and a fourth traffic indicator 364 indicating normal traffic flow), incident indicators (e.g., a first incident indicator 358 indicating a traffic accident and a second incident indicator 360 indicating construction), and/or a time remaining until route completion indicator 366. In an example, a predicted state of the route, corresponding to 4:10 pm to 4:50 pm, may be determined based upon a current state of the route, traffic flow and incident information for the route, and/or historical traffic flow conditions and incident resolution information. The traffic flow indicators, populated within the linear route progress interface 306, may correspond to predicted traffic flow indicators derived from the predicted state. The incident indicators, populated within the linear route progress interface 306, may correspond to predicted incident indicators derived from the predicted state. In this way, the user may view relevant traffic flow and incident information of the route for a time (e.g., 55 minutes from a current time of 3:15 pm) during which the user is traveling the route.

Figure 4:
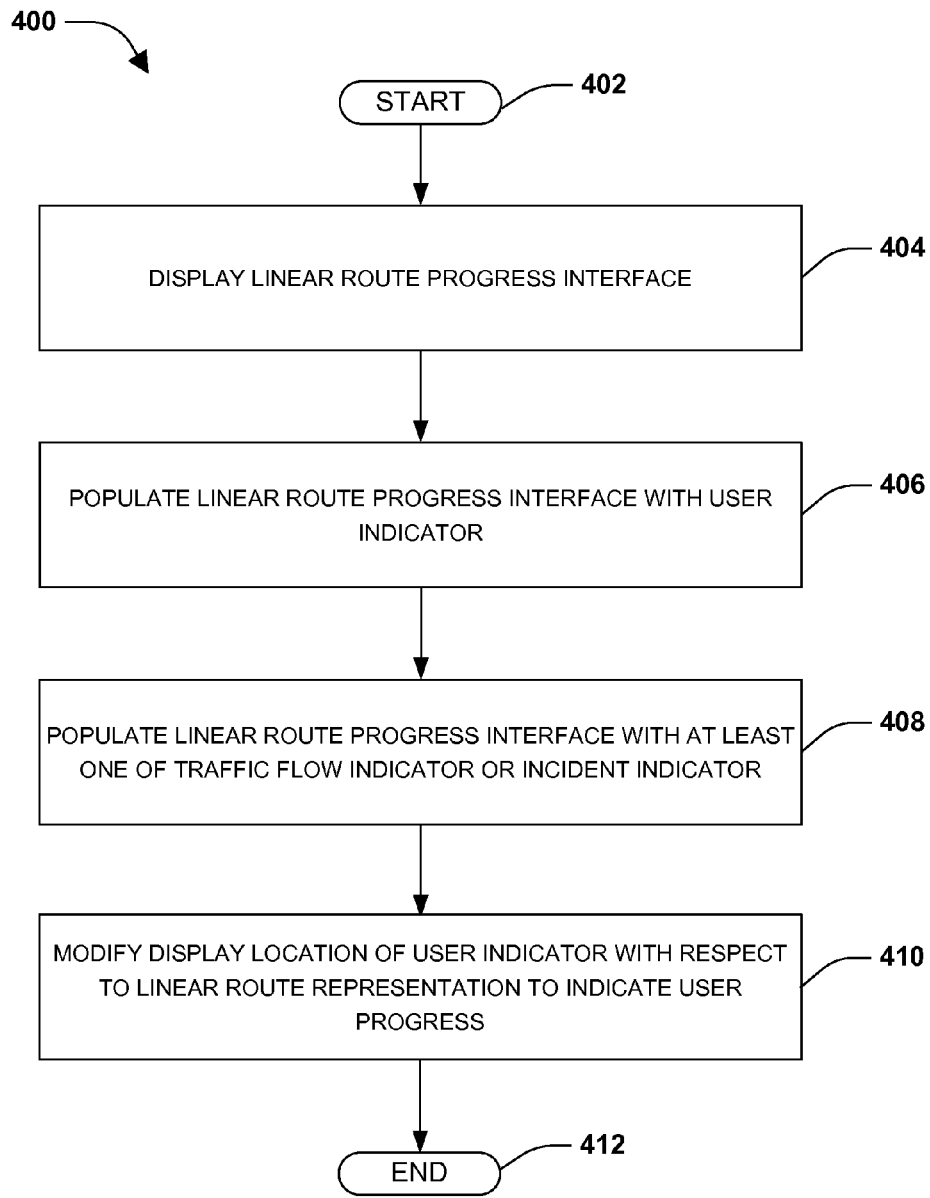
FIG. 4 is a flow diagram illustrating an exemplary method of providing linear route progress, where a user indicator is modified with respect to a linear route representation to indicate user progress.

An embodiment of providing linear route progress is illustrated by an exemplary method 400 of FIG. 4. At 402, the method starts. At 404, a linear route progress interface, comprising a linear route representation of a route from a starting location to a destination location, may be displayed. At 406, the linear route progress interface may be populated with a user indicator corresponding to a current position of a user. In an example, the linear route representation may be positioned at a fixed position within the linear route progress interface such that the user indicator may be moved with respect to the linear route representation to indicate user progress along the route. At 408, the linear route progress interface may be populated with traffic flow indicators and/or incident indicators. At 410, responsive to identifying user progress along the route, a display location of the user indicator may be modified with respect to the linear route representation. At 412, the method ends.

Figure 5A:
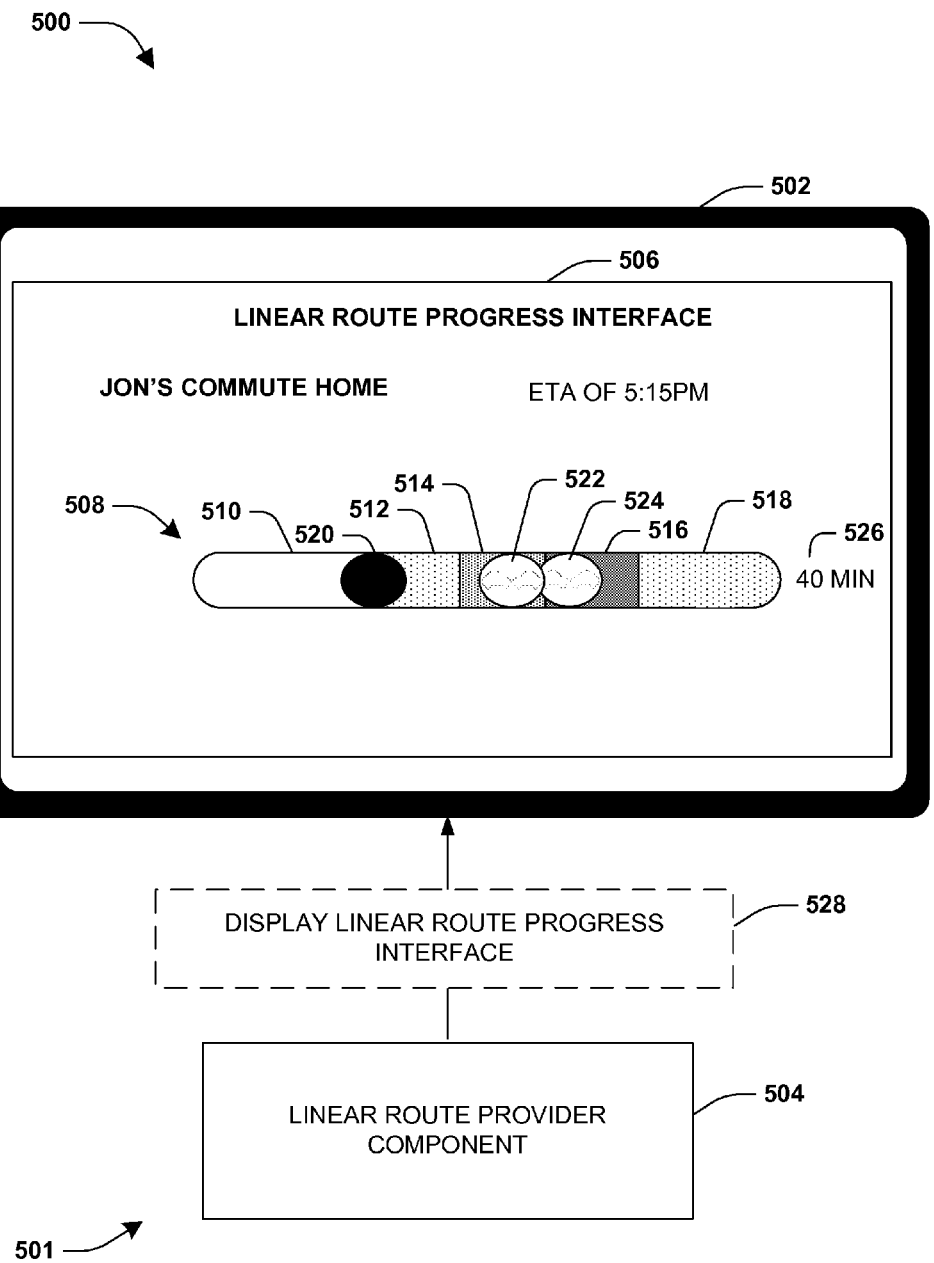
FIG. 5A is a component block diagram illustrating an exemplary system for providing linear route progress, where a linear route representation is displayed.
Figure 5B:
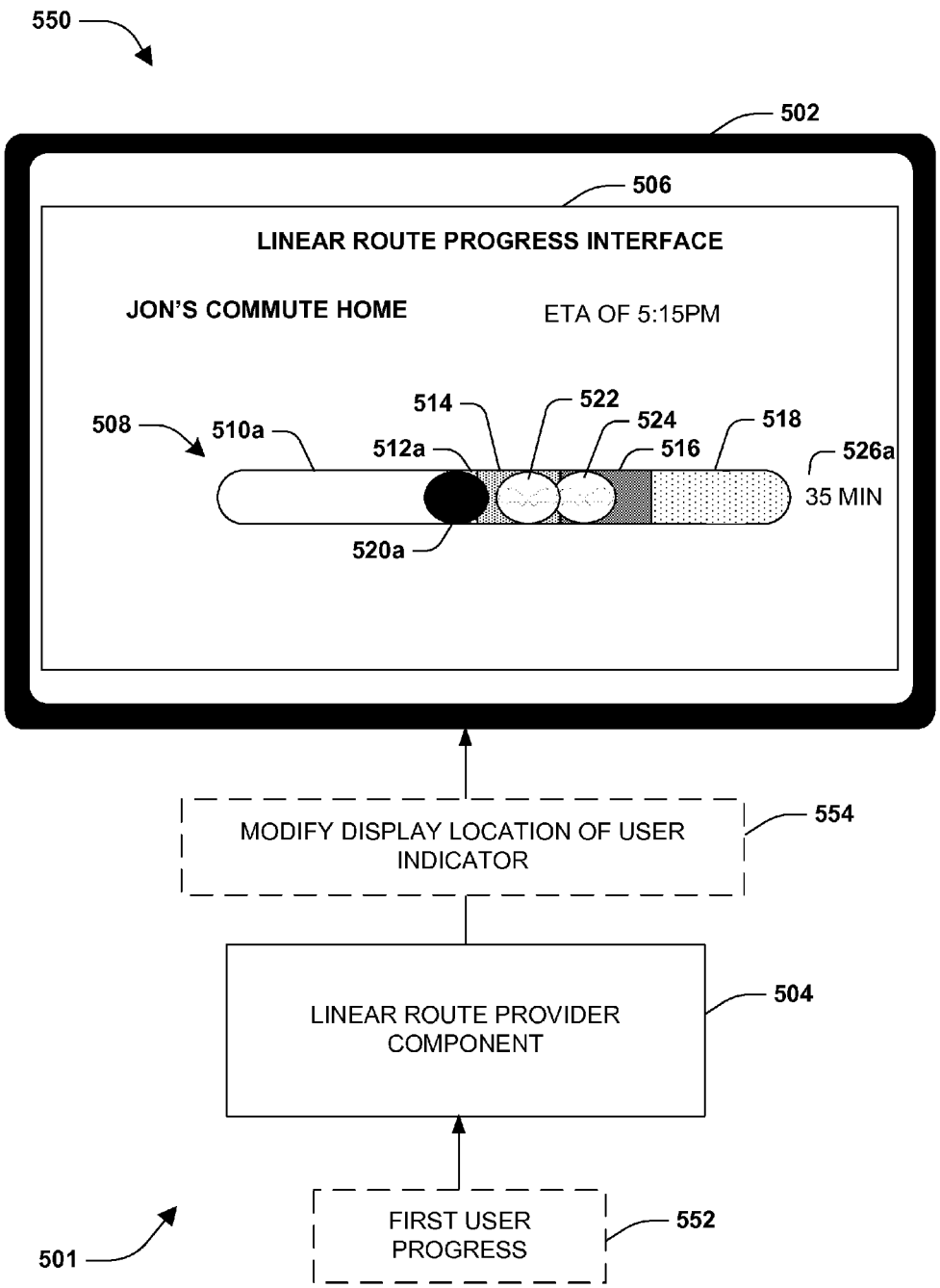
FIG. 5B is a component block diagram illustrating an exemplary system for providing linear route progress, where a user indicator is modified based upon first user progress.
Figure 5C:
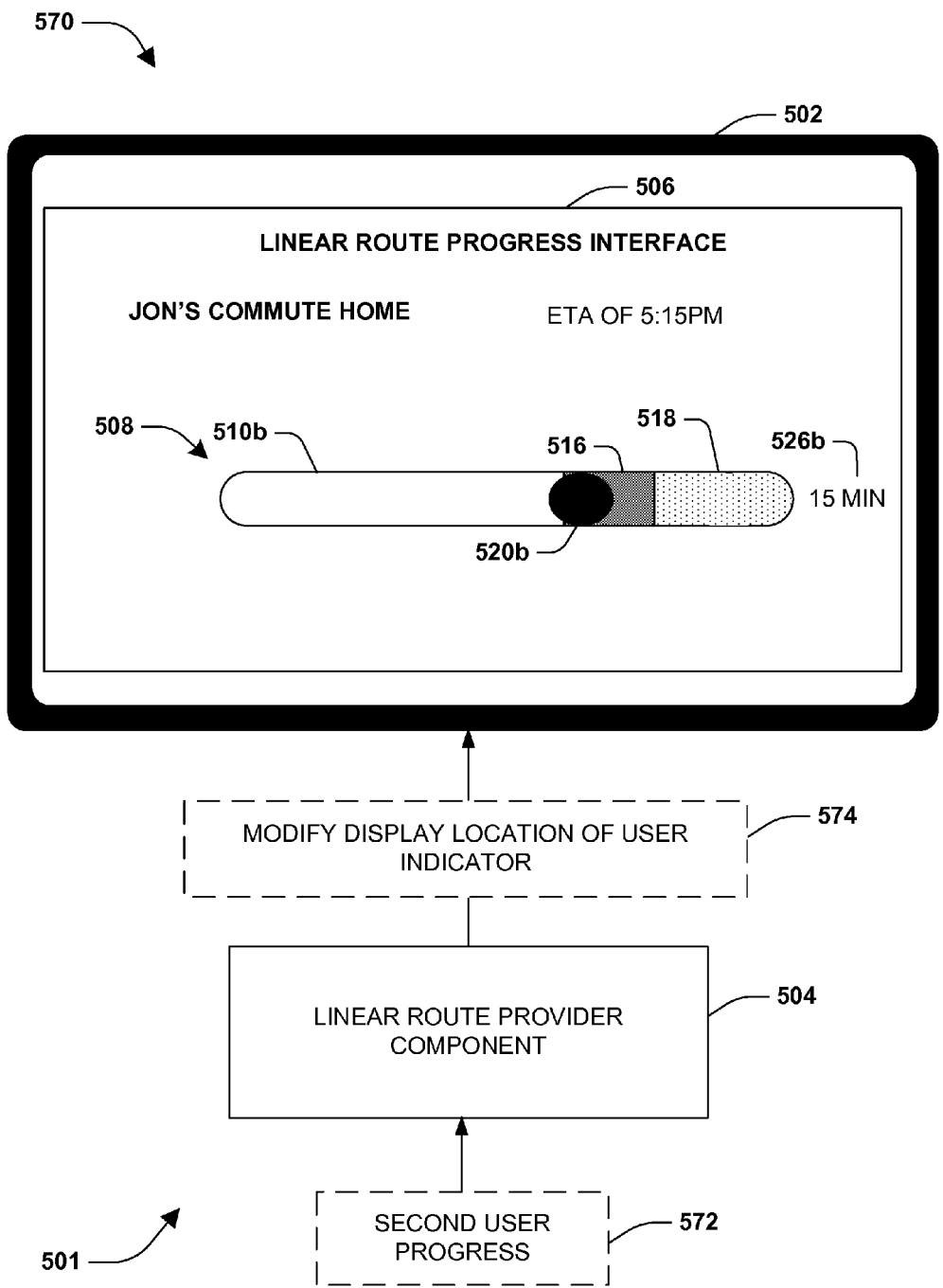
FIG. 5C is a component block diagram illustrating an exemplary system for providing linear route progress, where a user indicator is modified based upon second user progress.

FIGS. 5A-5C illustrate examples of a system 501, comprising a linear route provider component 504, for providing linear route progress. FIG. 5A illustrates an example 500 of the linear route provider component 504 displaying 528 a linear route progress interface 506, comprising a linear route representation 508 of a route from a starting location to a destination location, through a user device 502. The linear route representation 508 may be positioned at a fixed position within the linear route progress interface 506. The linear route progress interface 506 may be populated with a user indicator 520. A display location of the user indicator 520 may be moved relative to the linear route representation 508 to illustrate user progress along the route. A portion of the route already traveled by the user (e.g., 25% of the route) may be illustrated as a completed portion 510 of the liner route representation 508 that is displayed "behind" the user indicator 520. The linear route progress interface 506 may be populated with traffic flow indicators (e.g., a first traffic flow indicator 512, a second traffic flow indicator 514, a third traffic flow indicator 516, and a fourth traffic flow indicator 518), incident indicators (e.g., a first incident indicator 522 and a second incident indicator 524, and/or a time remaining until route completion indicator 526.

FIG. 5B illustrates an example 550 of the linear route provider component 504 modifying 554 the display location of the user indicator 520, with respect to the linear route representation 508, to a first updated display location based upon first user progress 552 along the route, resulting in a first modified user indicator 520*a*. For example, the user may travel an additional 15% of the route such that the user has traveled a total of 40% of the route. The first modified user indicator 520*a* may be moved to the first updated display location corresponding to a 40% progress point on the linear route representation 508. A portion of the linear route representation 508, corresponding to the 40% completed portion of the route, may be included with the completed portion 510 of the linear route representation 508, resulting in a first updated completed portion 510*a*. Because at least some of the 15% first user progress 552 may correspond to the first traffic flow indicator 512, at least some of the first traffic flow indicator 512 may be included with the first updated completed portion 510*a*, thus resulting in an updated first traffic flow indicator 512*a*. The linear route provider component 504 may update the time remaining until route completion indicator 526 based upon the first user progress 552 (e.g., the time remaining may be decreased from 40 minutes to 35 minutes), resulting in a first updated time remaining until route completion indicator 526*a*.

FIG. 5C illustrates an example 570 of the linear route provider component 504 modifying 574 the first updated display location of the first modified user indicator 520*a*, with respect to the linear route representation 508, to a second updated display location based upon second user progress 572 along the route, resulting in a second modified user indicator 520*b*. For example, the user may travel an additional 20% of the route such that the user has traveled a total of 60% of the route. The second modified user indicator 520*b* may be moved to the second updated display location corresponding to a 60% progress point on the linear route representation 508. A portion of the linear route representation 508, corresponding to the 60% completed portion of the route, may be included with the first updated completed portion 510*a* of the linear route representation 508, resulting in a second updated completed portion 510*b*. The linear route provider component 504 may update the first updated time remaining until route completion indicator 526*a* based upon the second user progress 572 (e.g., the time remaining may be decreased from 35 minutes to 15 minutes), resulting in a second updated time remaining until route completion indicator 526*b*. In this way, the user may view traffic flow and incident information through a linear progress bar that may not visually overwhelm the user.

Figure 6:
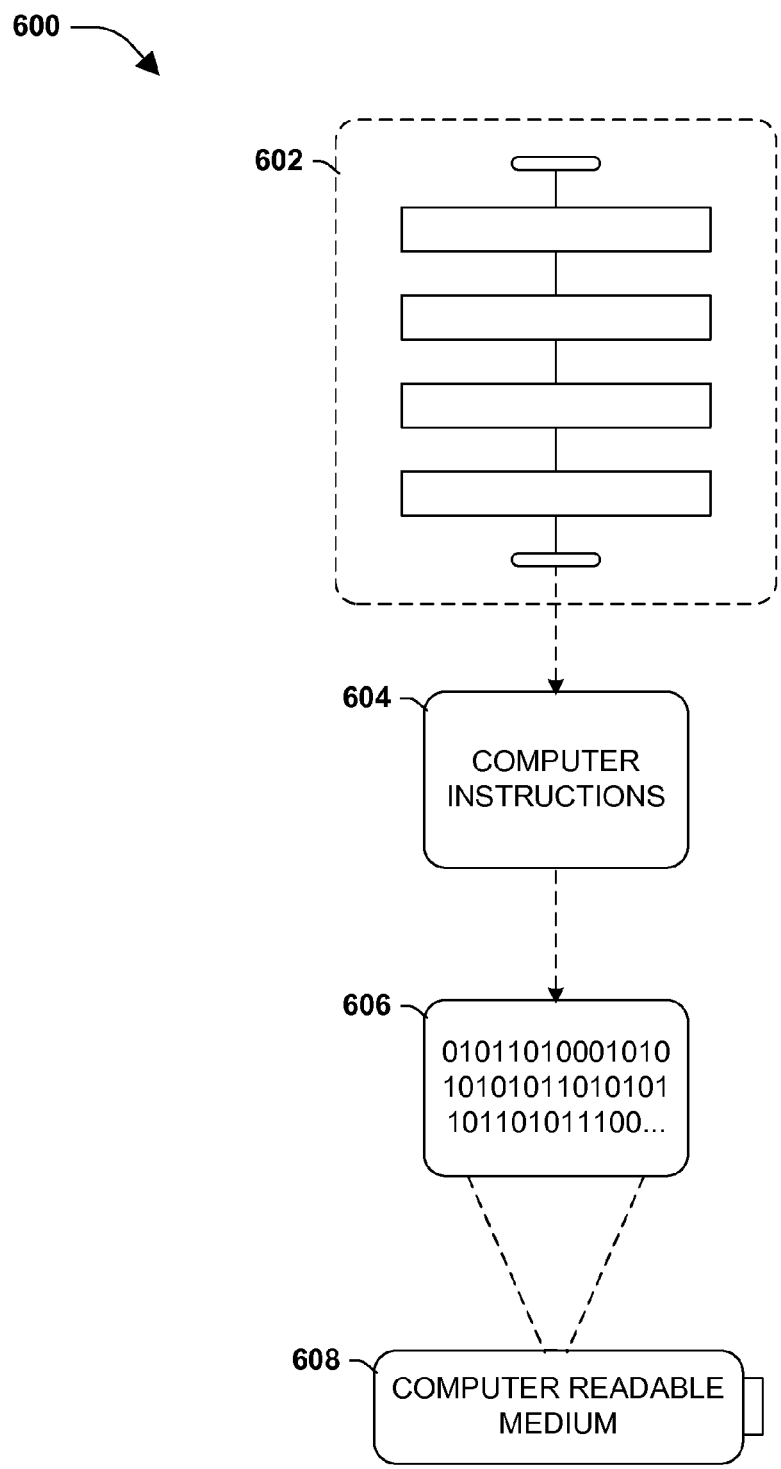
FIG. 6 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 100 of FIG. 1 and/or at least some of the exemplary method 400 of FIG. 4, for example. In some embodiments, the processor-executable instructions 604 are configured to implement a system, such as at least some of the exemplary system 201 of FIGS. 2A-2D, at least some of the exemplary system 301 of FIGS. 3A and 3B, and/or at least some of the exemplary system 501 of FIGS. 5A-5C, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
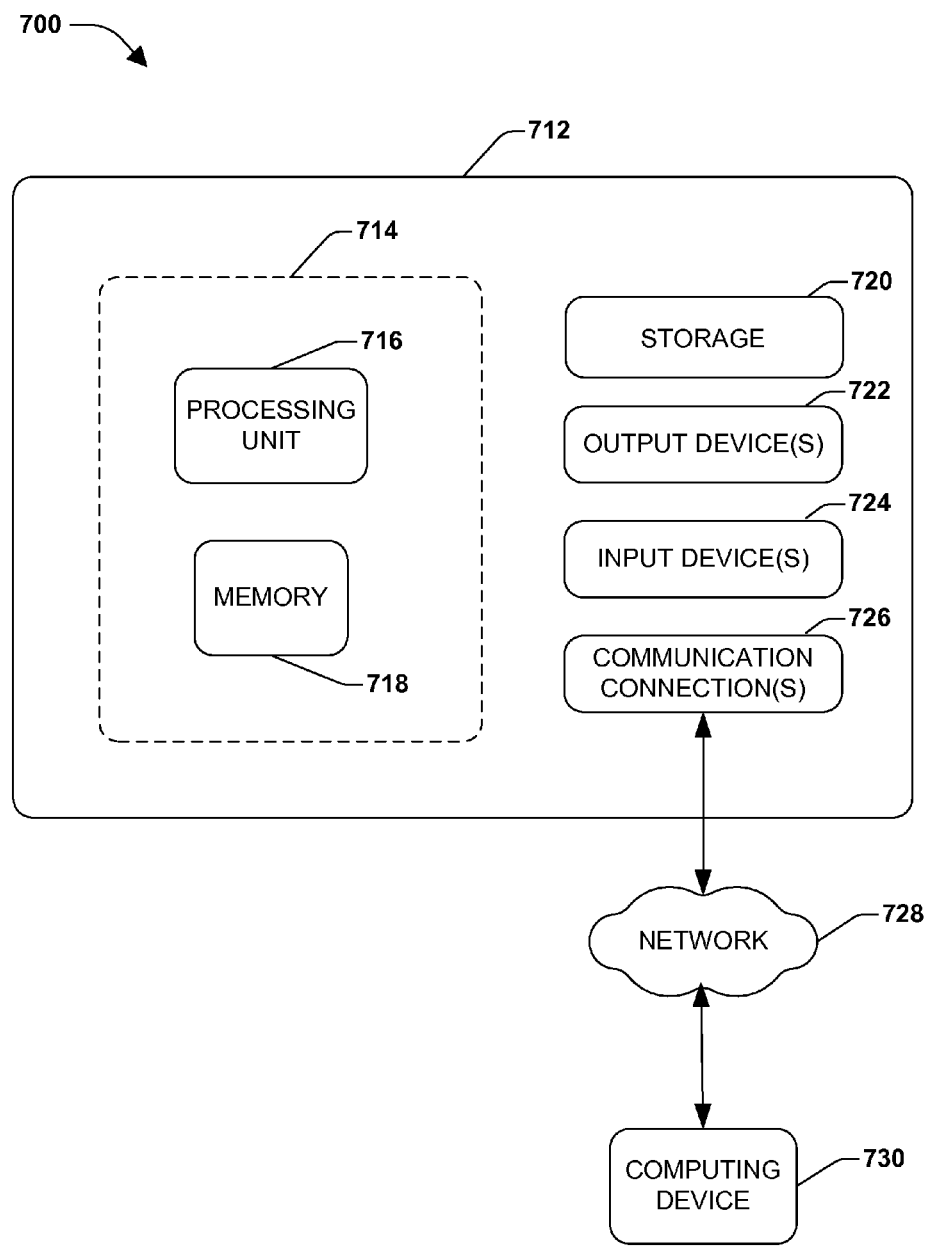
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Computer storage media does not, however, include propagated signals. Rather, computer storage media excludes propagated signals. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for providing linear route progress, the method involving a computing device comprising a processor, and the method comprising:

executing, on the processor, instructions that cause the computing device to perform operations, the operations comprising:

displaying a linear route progress interface comprising a linear route representation of a route from a starting location to a destination location;

populating the linear route progress interface with a user indicator corresponding to a current position of a user;

populating the linear route progress interface with at least one of a traffic flow indicator or an incident indicator; and responsive to identifying user progress along the route, modifying a display location of the user indicator with respect to the linear route representation to indicate the user progress.

2. The method of claim 1, the displaying a linear route progress interface comprising:

formatting the liner route representation according to a linear non-map configuration.

3. The method of claim 1, the displaying a linear route progress interface comprising:

positioning the linear route representation at a fixed position within the linear route progress interface.

4. The method of claim 1, the displaying a linear route progress interface comprising:

displaying a time remaining until route completion indicator; and responsive to identifying at least one of the user progress, a current travel condition change, or an estimated travel condition change, updating the time remaining until route completion indicator.

5. The method of claim 1, comprising:

populating the linear route progress interface with an alternative linear route representation of an alternative route from a start detour location to the destination location.

6. The method of claim 1, comprising:

responsive to the user indicator corresponding to a segment of the linear route representation, expanding a view of the segment to an expanded view, the expanded view having an increased level of granularity for at least one of traffic flow information or incident information.

7. The method of claim 1, comprising:

responsive to the user progress indicating that the user traveled from a first route segment to a second route segment, modifying the linear route representation with respect to the user indicator to indicate that the first route segment has been traveled and that the second route segment is currently being traveled by the user.

8. The method of claim 1, the populating the linear route progress interface with at least one of a traffic flow indicator or an incident indicator comprising:

generating a predicted state of the route corresponding to a time at which the user is predicted to traverse the route; and populating the linear route progress interface with at least one of a predicted traffic flow indicator or a predicted incident indicator based upon the predicted state.

9. The method of claim 8, the generating a predicted state comprising:
obtaining a current state of the route;
identifying traffic flow and incident information for the route; and
generating the predicted state based upon the current state and the traffic flow and incident information.

10. The method of claim 8, the generating a predicted state comprising:
obtaining a current state of the route;
identifying historical traffic flow conditions and incident resolution information for the route; and
generating the predicted state based upon the current state and the historical traffic flow conditions and incident resolution information.

11. The method of claim 1, the populating the linear route progress interface with at least one of a traffic flow indicator or an incident indicator comprising:
obtaining a current state of the route; and
populating the linear route progress interface with at least one of a current traffic flow indicator or a current incident indicator based upon the current state.

12. The method of claim 1, the displaying a linear route progress interface comprising:
displaying the linear route representation as a vertical progress bar.

13. The method of claim 1, comprising:
exposing a route creation interface to the user, the route creation interface comprising at least one of a route departure time specification interface or a destination arrival time specification interface;
receiving a generate route request from the user through the route creation interface, the generate route request comprising at least one of the starting location, the destination location, a specified route departure time, or a specified destination arrival time; and
generating the linear route progress interface based upon the generate route request.

14. The method of claim 13, at least one of the route departure time specification interface or the destination arrival time specification interface comprising a slider interface element.

15. A non-transitory computer readable medium comprising instructions which when executed perform a method for providing linear route progress, comprising:
displaying a linear route progress interface comprising a linear route representation of a route from a starting location to a destination location;
populating the linear route progress interface with a user indicator corresponding to a current position of a user;
populating the linear route progress interface with at least one of a traffic flow indicator or an incident indicator; and
responsive to identifying user progress along the route, modifying a display location of the user indicator with respect to the linear route representation to indicate the user progress.

16. The non-transitory computer readable medium of claim 15, the populating the linear route progress interface with at least one of a traffic flow indicator or an incident indicator comprising:

generating a predicted state of the route corresponding to a time at which the user is predicted to traverse the route; and
populating the linear route progress interface with at least one of a predicted traffic flow indicator or a predicted incident indicator based upon the predicted state.

17. The non-transitory computer readable medium of claim 15, the method comprising:
responsive to the user indicator corresponding to a segment of the linear route representation, expanding a view of the segment to an expanded view, the expanded view having an increased level of granularity for at least one of traffic flow information or incident information.

18. The non-transitory computer readable medium of claim 15, the method comprising:
populating the linear route progress interface with an alternative linear route representation of an alternative route from a start detour location to the destination location.

19. A system for providing linear route progress, comprising:
a linear route provider component configured to:
display a linear route progress interface comprising a linear route representation of a route from a starting location to a destination location;
populate the linear route progress interface with a user indicator corresponding to a current position of a user;
populate the linear route progress interface with at least one of a traffic flow indicator or an incident indicator; and
responsive to identifying user progress along the route, modify a display location of the user indicator with respect to the linear route representation to indicate the user progress.

20. The system of claim 19, the linear route provider component configured to:
generate a predicted state of the route corresponding to a time at which the user is predicted to traverse the route; and
populate the linear route progress interface with at least one of a predicted traffic flow indicator or a predicted incident indicator based upon the predicted state.

21. A method for providing linear route progress, the method involving a computing device comprising a processor, and the method comprising:
executing, on the processor, instructions that cause the computing device to perform operations, the operations comprising:
displaying a linear route progress interface comprising a linear route representation of a portion of a route;
populating the linear route progress interface with a user indicator with respect to the linear route representation, the user indicator corresponding to a current position of a user along the portion of the route;
populating the linear route progress interface with a traffic flow indicator with respect to the linear route representation, the traffic flow indicator corresponding to traffic flow along at least some of the portion of the route; and
responsive to identifying user progress along the portion of the route, modifying a display location of the user indicator with respect to the linear route representation to indicate the user progress.

22. The method of claim 21, the traffic flow indicator corresponding to a color applied to a segment of the linear route representation.

23. A method for displaying a linear route progress interface, the method involving a computing device comprising a processor, and the method comprising:
- executing, on the processor, instructions that cause the computing device to perform operations, the operations comprising:
- displaying a linear route progress interface comprising a linear route representation of a portion of a route from a starting location to a destination location;
- responsive to identifying an incident along the route, populating the linear route progress interface with an incident indicator with respect to the linear route representation, the incident indicator corresponding to the incident; and
- responsive to identifying user progress along the route, modifying a display location of a user indicator, corresponding to a current position of the user, with respect to the linear route representation to indicate the user progress.

24. The method of claim 23, wherein a distance between a starting point of the linear route representation and the incident indicator is proportional to a distance between the incident and the starting location.

25. The method of claim 23, the displaying a linear route progress interface comprising:
- displaying a time remaining until route completion indicator.

26. The method of claim 23, comprising:
- populating the linear route progress interface with a second linear route representation of a portion of a second route from the starting location to the destination location.

* * * * *